United States Patent
Bozich et al.

(10) Patent No.: US 7,689,583 B2
(45) Date of Patent: Mar. 30, 2010

(54) FLEXIBLE DATA PRESENTATION ENABLED BY METADATA

(75) Inventors: David M. Bozich, Enumclaw, WA (US); Jeanine E. Spence, Seattle, WA (US); Kathleen Linscott, Seattle, WA (US); Rob Nichols, Gig Harbor, WA (US); Wai Chan, Bellevue, WA (US); Scott Neilson, Seattle, WA (US); Craig Combel, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 11/518,690

(22) Filed: Sep. 11, 2006

(65) Prior Publication Data

US 2008/0065675 A1 Mar. 13, 2008

(51) Int. Cl.
*G06F 17/00* (2006.01)
(52) U.S. Cl. ...................... 707/102; 715/204
(58) Field of Classification Search .............. None
See application file for complete search history.

(56) References Cited

U.S. PATENT DOCUMENTS

| | | | |
|---|---|---|---|
| 5,721,911 A | 2/1998 | Ha et al. | |
| 6,434,568 B1 | 8/2002 | Bowman-Amuah | |
| 6,701,345 B1 | 3/2004 | Carley et al. | |
| 7,013,290 B2 * | 3/2006 | Ananian | 705/27 |
| 7,299,202 B2 * | 11/2007 | Swanson | 705/27 |
| 2002/0055924 A1 * | 5/2002 | Liming | 707/100 |
| 2003/0046639 A1 | 3/2003 | Fai et al. | |
| 2003/0131013 A1 | 7/2003 | Pope et al. | |
| 2003/0149941 A1 | 8/2003 | Tsao | |
| 2003/0179871 A1 | 9/2003 | Ito et al. | |
| 2003/0208493 A1 | 11/2003 | Hall et al. | |
| 2004/0249821 A1 | 12/2004 | Nies et al. | |
| 2005/0216482 A1 * | 9/2005 | Ponessa | 707/100 |
| 2006/0047665 A1 | 3/2006 | Neil | |
| 2006/0143220 A1 | 6/2006 | Spencer, Jr. | |
| 2007/0130145 A1 | 6/2007 | Pedersen et al. | |
| 2008/0065580 A1 | 3/2008 | Spence et al. | |
| 2008/0065668 A1 | 3/2008 | Spence et al. | |

OTHER PUBLICATIONS

Nanard et al., "Integrating Knowledge-based Hypertext and Database for Task-oriented Access to Documents", Proceedings of the 4th International Conference on Database and Expert Systems Applications, Sep. 1993.

Hughes et al., "The Planetary Data System Data Model", Proceedings Twelfth IEEE Symposium on Mass Storage Systems, Apr. 26-29, 1993.

* cited by examiner

*Primary Examiner*—Pierre M Vital
*Assistant Examiner*—Sheikh M Kabir

(57) ABSTRACT

Architecture that defines a document or portions thereof as data elements that are related and categorized. A data catalog is created that uses a schema for the data elements and a set of relationships, attributes and values that further define the data elements, all stored as metadata about the data elements. The metadata is employed to enable the application, display surface, and user to see only data relevant to the task at hand. The positioning and grouping of controls, control characteristics, and control behavior at the display surface is facilitated by forms which are dynamically populated for presentation and which are driven directly by the data catalog. The catalog can be made aware of device parameters, for example, the display size and resolution thereby enabling data to be displayed differently based upon the device parameters.

20 Claims, 12 Drawing Sheets

FLEXIBLE DATA PRESENTATION ENABLED BY METADATA

BACKGROUND

Business users need to see information related to what they are working on at the time. What hinders information workers today is the often-complicated process of locating the right information needed to complete their work. Information is stored at multiple locations and in varying formats. In spite of the promise of automation, application integration is inadequate or nonexistent for small to midsize companies, and line-of-business (LOB) applications do not supply all the information needs of the worker.

Striving to remain effective, workers typically seek out and employ methods that are cumbersome in order to compare, manage, produce, and track information in a constant flow of documents. For example, oftentimes, personnel are required to rely on paper copies and handwritten notes, tracking lists to patch the data flow in their processes. The worker must search for information using one application to find one piece of information in one document, write it on paper, then switch to another application or source, find another piece of information, and then compare the two.

Conventional systems are limited because of the lack of correlation and lack of an information model describing the relationships between the data. Today's application display surfaces govern the layout, interaction, and behavior of information that is available to a user. Information is stored in association with independent applications where each application manages and describes the relationship of the data and how that information behaves. However, there is little or no correlation of data between applications and, when there is correlation, it is usually at the document level such as for a purchase order, e-mail message, or word document. This ubiquitous need to move information from one context to another throughout the workday places a cognitive burden on the worker, frequently causes the inefficient duplication of effort, and introduces unwanted errors such as associated with transcribing and copying.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed is architecture that allows documents or portions thereof to be broken down and defined at a data element level. This supports elemental data based storage with attributes and relationships about the data elements stored as metadata. This further supports the ability to relate structured and unstructured information using the metadata and elemental relationships as needed without requiring logic in the display surface. Data elements can then be related, categorized, and defined at a data element level.

A data element is defined as a key piece of data designated in, for example, a document or communication. Related and categorized data elements are organized into data catalogs. The data catalog contains individual data elements and identifies the various contexts (e.g., role, user, process, document, point in time, and device) in which the data elements are used. Algorithms are defined for how the data should be processed, using the metadata to enable the application, and the display surface to sort, filter, organize the information so that the user sees relevant data, which can be a subset of all data available. Data from the business applications, for example, can be represented as metadata-defined data linked into an information model of the data allowing data to be surfaced and appear related independent of the application and even if the application is unavailable at the time. In other words, a data catalog (also referred to herein as a defined information model) is developed that specifies the storage of documents or portions thereof as data elements having attributes and relationships of the data elements stored as metadata. A presentation model is provided that includes forms which are dynamically populated with the data elements considered relevant and being elevated for display.

A flexible display layer (that is not fixed) is provided, interacts with the user based upon user preferences and rules, and is driven by information model enabled classes and data. The positioning and grouping of controls, control characteristics, and control behavior is driven directly by the information model and not by the display surface or device. Additionally, the information model is made aware of the size and characteristics of the display thereby enabling data to be displayed differently based upon the pixel density of the display.

The architecture provides the ability to automatically sense data availability from different sources allowing data and applications to surface up into the display surface within the overall display environment, if the application is available, or using cached data if the application is not available, without requiring effort on the part of the user who does not have to leave the current display surface and lose context. This is accomplished using methods that define the data locations and methods for accessing the locations, as well as references to associated data elements. In other words, data can be accessed from many different sources and presented in an organized format to the user via the display surface.

In support thereof, the architecture disclosed and claimed herein comprises a computer-implemented system that facilitates data management. The system comprises an information model for specifying information as data elements and data element relationships in metadata, the metadata associated with the data elements, and a display component driven by the information model for displaying the data elements based on the metadata and a current user activity.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
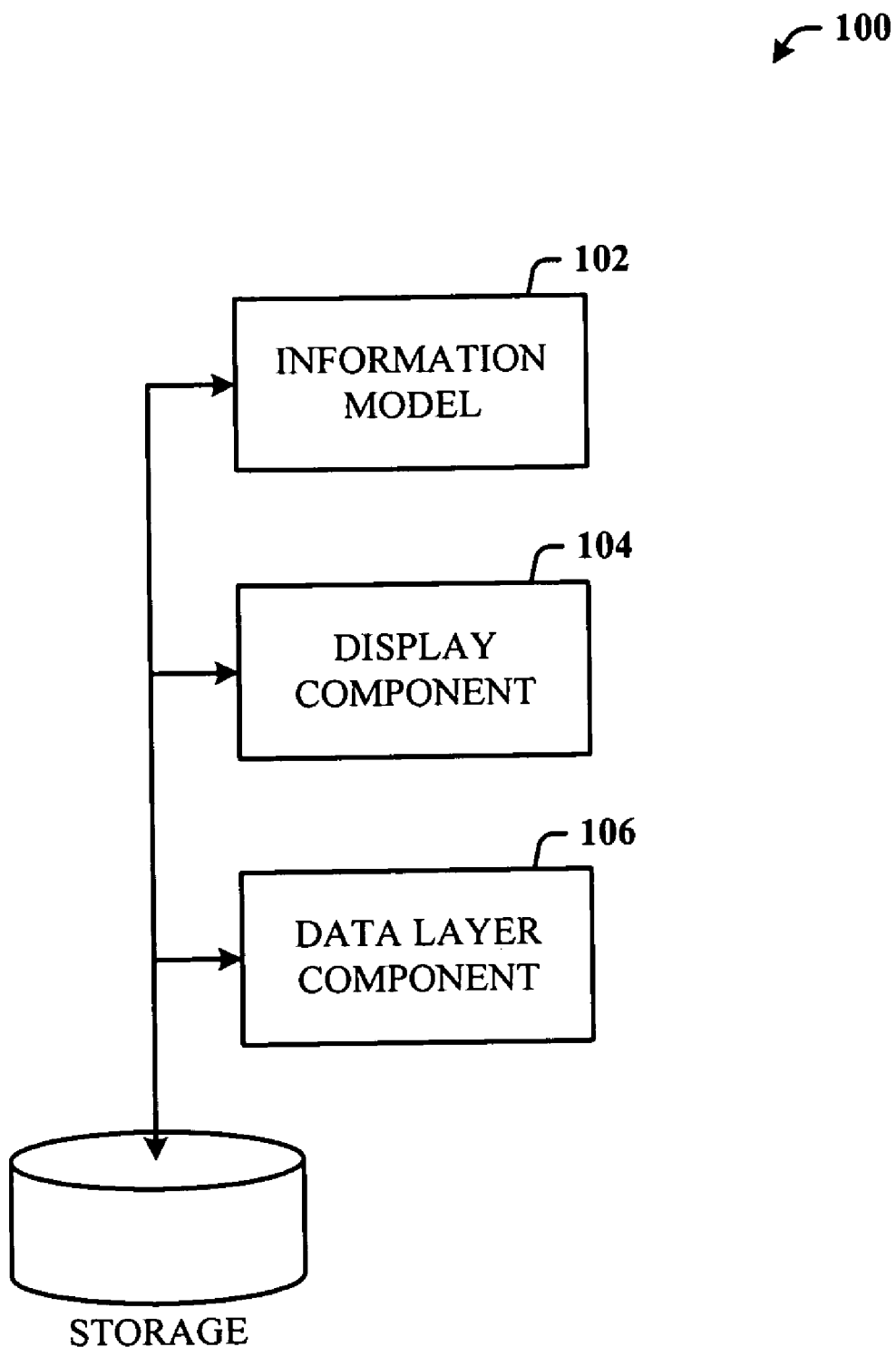
FIG. 1 illustrates a computer-implemented system that facilitates data handling and presentation in accordance with the subject architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The architecture described herein allows documents to be broken down into data elements that are related, categorized, and defined at the data element level. Metadata associated with the data elements defines how the data should be processed. Metadata is used to enable an application, a display surface, and the user to see only the relevant data. An information model (also referred to as a data catalog) includes a schema that specifies data elements and, element relationships and attributes stored as the metadata. All known information is stored in the information model, which can be created and updated as an application is used.

A flexible display (or presentation) component is driven by the information model. Relevant and related data are surfaced and can be presented in different ways. Hierarchical levels determine the layer in which data will be displayed. For example, the most important and relevant data, and which is the smallest amount of data, can be displayed via a first level. Other related data can be displayed on subsequent levels, and in greater amounts, as desired.

As used herein, the hierarchical structure of the data is intended to include rank and priority (both on a personal level as well as a group level), an item is a specific data element (such as a user name, document title, or field on a display surface), and relevance, as computed herein, includes order, priority and rank (both on a personal level, as well as a group level).

Referring initially to the drawings, and in support of at least the above capabilities, FIG. 1 illustrates a computer-implemented system 100 that facilitates data handling and presentation. The system 100 includes an information model 102 for specifying storage of data elements and relationships of the data elements in metadata, the metadata associated with the data elements. A display component 104, driven by the information model, provides for flexible display of the data elements.

The innovation begins with the data schema and how the data (also referred to interchangeably as a document) is stored. The document or portions thereof are broken down into data elements. Each data element is stored as a separate entity with relationships to other element entities. The information model specifies a schema and methodology for relating, categorizing and defining data at the data element level. The information model, describing all known information, is created and updated as an application is used. For example, if a user changes data or causes an action to be performed at particular point in a workflow, this interaction information can be stored as an update to the information (or data catalog). The information model is both a schema for the data and a set of relationships, attributes, and values that further define the data. Additionally, transient (or cached data) is stored in the information model as most of the data actually resides in persistent storage in other applications.

The concept of storing information at the elemental level aids in dealing with unstructured documents. Breaking a document down into related data elements allows similar elements to be easily found and cataloged. In other words, consider that a user can explicitly designate that certain content in a document (e.g., a web page, word-processing document, etc.) be deemed important or of interest. The various pieces of content can be designated as related at least insofar as the content is from the same document. Other similarity data can include, the user, the role of the user, the user context, and so on. Thus, the similar elements have defined relationships to one another. Moreover, the relationships can further be defined according to levels of relevancy to the source (the document) of the data elements.

In other words, the content designated by the user in this document can be more relevant to this document than to another document. Accordingly, stored data elements can be selected and elevated to the display surface (in dynamic forms) based on the relevancy of the data elements to the task at hand. If the user is not currently working to cause the document is being accessed, then the associated data elements will not be accessed and surfaced at that time, since the data elements are not sufficiently relevant to the task at hand. On the other hand, at a different point in time user activity can be such that the document data elements are deemed more relevant to the task at hand, and will be selected and elevated to the display surface. Additionally, based on the relationships, related data elements can also be selected and presented based on relevance. Structured and unstructured information can now be related as needed using the metadata and the elemental relationships of the data elements without requiring logic in the display surface.

The information model is a multidimensional "cube" or catalog of data that supports data elevation, a concept whereby correlated data is automatically surfaced to the user interface (UI). The data catalog defines a data schema and how the data is stored. The data catalog contains content relating to the schema and internal processes, as well as the external content that constitutes the documentation and information required by processes (e.g., business) of a company. (Note that throughout this description, the architecture will be described in the context of business processes. However, this is only one implementation, and is not to be construed as limiting in any way.)

The data catalog can be extended or new catalogs created to meet the specific needs of different industries and customers. Thus, custom data catalogs can be an asset to an independent software provider (ISV), for example, which can then can be sold. After installation (e.g., at a customer site), the data catalog grows and evolves over time through use, thereby providing a flexible and responsive mechanism that learns from the worker choices making the process worker's job easier. For example, consider a shared or collaboration environment where multiple users can access the same information such as a document. Further consider that the document was initially created by a single user and the user interacted with the document causing a data catalog of data elements, attributes and relationships to be created and stored in metadata. The data catalog can include user information such as user name, role, permissions, and so on, stored as metadata. As indicated before, the data catalog need not include data elements for all pieces of data of the document but only a portion or subset thereof. The user then allows access to this document by multiple other users. A second user then accesses the document and makes changes to the same portions of data or even different portions of the document. The initial data catalog can then be updated according to activity by the second user. Thus, it can be seen that the data catalog can change over time.

As indicated above, the data catalog supports data elevation. The data catalog drives the semantics of data behavior (e.g., data elevation), what is seen, where, when, and by whom, in the UI; more specifically, who (the user roles and permissions), what (data from one of more related or dependent documents), where (the process (or step) to be accomplished), when (the status of the process or child/parent process (time element)), how (layout of data on the form), and how much (levels of content based on context, user role, data importance, and relationship to other data elements; the user controls how much they want to see).

Storage requirements for the data catalog mean the database supports the following: data hierarchy, ranking for layout (values of high, medium, low), ranking per role and document/process; form layout rules (container relationship (including nested containers) and positioning of data on the form; relevance (multidimensional correlation of related documents and data); role access (view rights and update rights); versioning and audit trail of user change of elevated data; personalization (user-specific layer on top of basic settings); and, source of the data (integrated transactional database, file (document type), and URL). The database is able to correlate a data element across multiple documents, and multiple documents and processes can reference the same data element.

The display component 104 provides a display layer that is not fixed, interacts with the user based upon user preferences and rules, and is driven by classes and data enabled by the information model. The positioning and grouping of controls, control characteristics, and control behavior are driven directly by the information model and not by the display surface or device. The information model is made aware of the size and characteristics of the display thereby enabling different data to be displayed based upon the pixel density of the display.

The system 100 can further include a data layer component 106 for automatically sensing source data. The data layer component 106 provides the capability to automatically sense the availability of source data allowing applications to poke through the display surface into an application display, if available, or use cached data, if not available, without leaving the current display surface and losing context. Metadata-defined data from business applications can be represented and linked with information model data allowing data to be surfaced and appear related, even if the application is unavailable. Levels of relationship of one data source to another are monitored, which can occur through an explicit act by the user or implicitly through the system's tracking of the worker's usage. Data is elevated to the UI based on its relevance to the source that is in focus.

Figure 2:
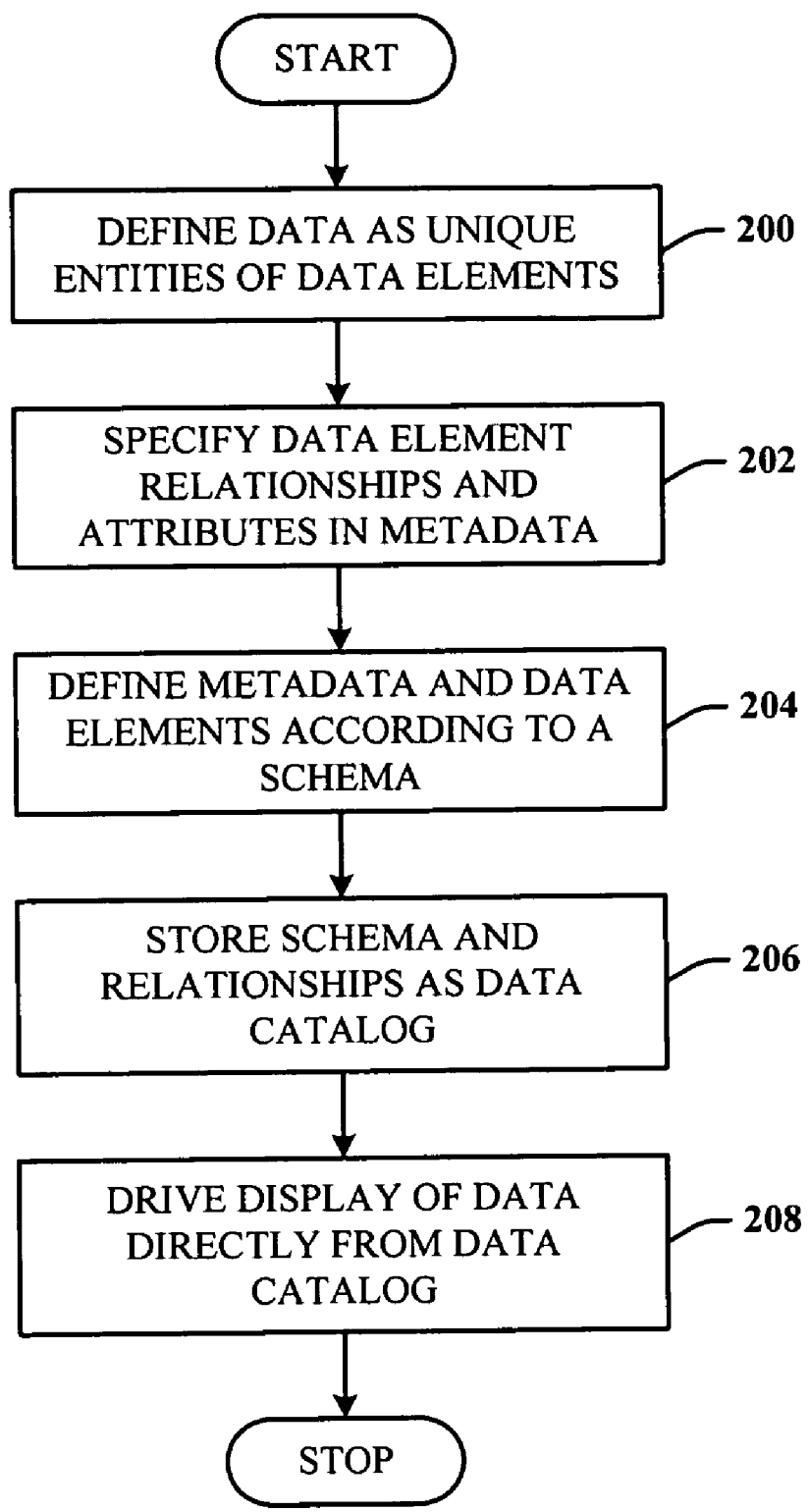
FIG. 2 illustrates a methodology of data handling and presentation.

FIG. 2 illustrates a methodology of data handling and presentation. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with the innovation.

At 200, data is defined and stored as a set of one or more unique data elements. At 202, data element relationships and attributes are specified and stored as metadata. At 204, the metadata and data elements are defined according to a schema. At 206, the schema and metadata is stored as a data catalog. At 208, data display is driven directly from the data catalog.

As indicated, each data element is stored as a unique entity with attributes, values, and history. Each data element to be displayed is defined as a single entity in a database, in a MetaDataDefinitions table. Each data element can then have one or more UI representations as defined in the table.

Each data element can have one or more sources that are prioritized by order, priority, and rank. For example, the supporting algorithms can be the following:

OrderOfData = Max(source.order, source.priority, source.rank)
DisplayData = DisplaySource(Max(Source.Priority)).Value Each data element can be prioritized for viewing by order, priority, and rank. The algorithm can be as follows:

VisibilityOfData = Max((Max(source.order, source.priority, source.rank), Max(viewing.order, viewing.priority, viewing.rank))

Figure 3:
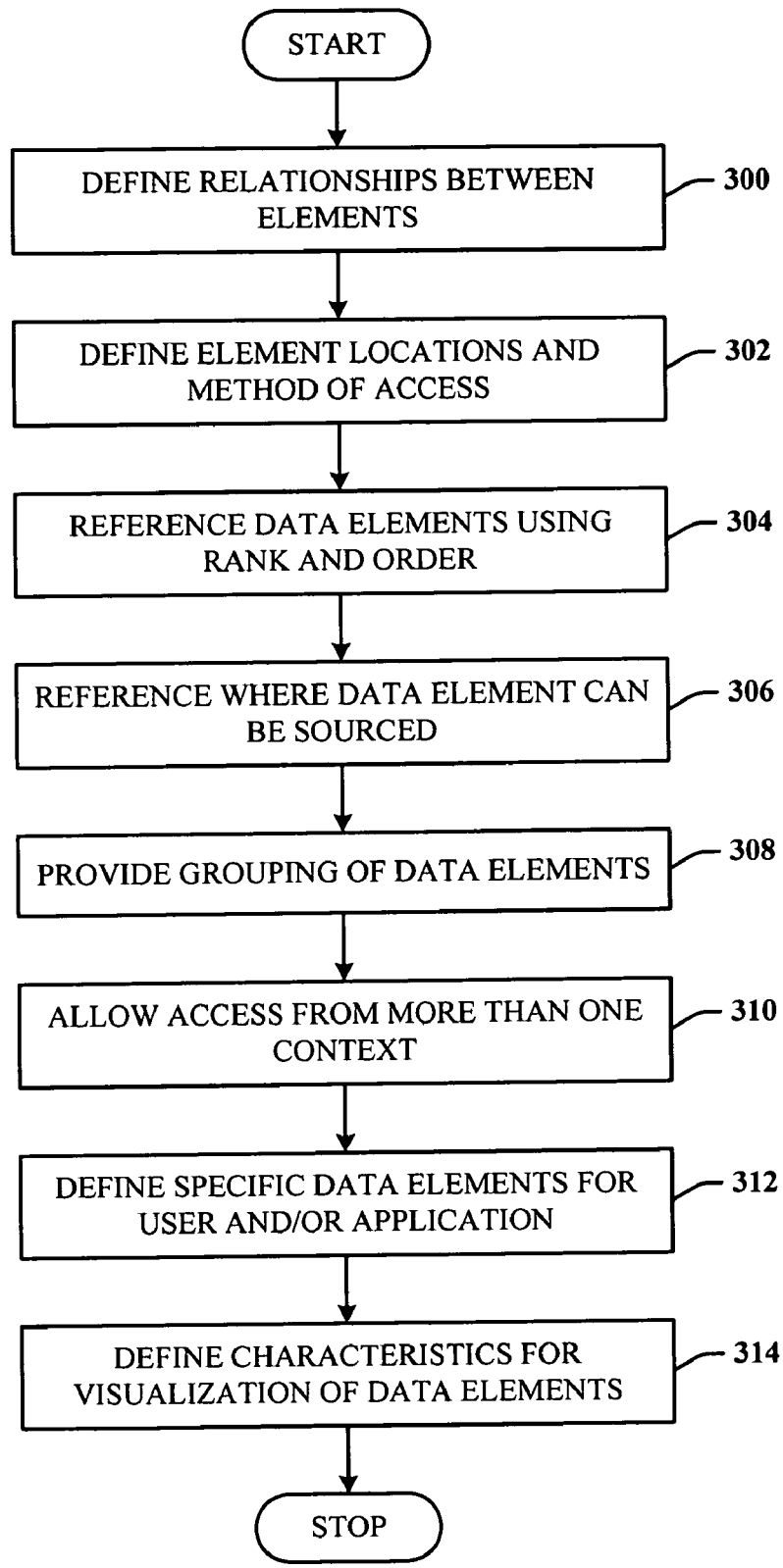
FIG. 3 illustrates a methodology of defining an information model for elemental data relationships and storage.

FIG. 3 illustrates a methodology of defining an information model for elemental data relationships and storage. At 300, relationships between data elements are defined. At 302, data element locations and methods of access are defined. At 304, referencing of data elements is defined using rank and order. At 306, the system references where the data element can be sourced. At 308, grouping of data elements is provided. At 310, access is allowed to the data elements from one or more contexts. At 312, specific data elements for the user and/or application are defined. At 314, characteristics for visualization of the data elements are defined.

Figure 4:
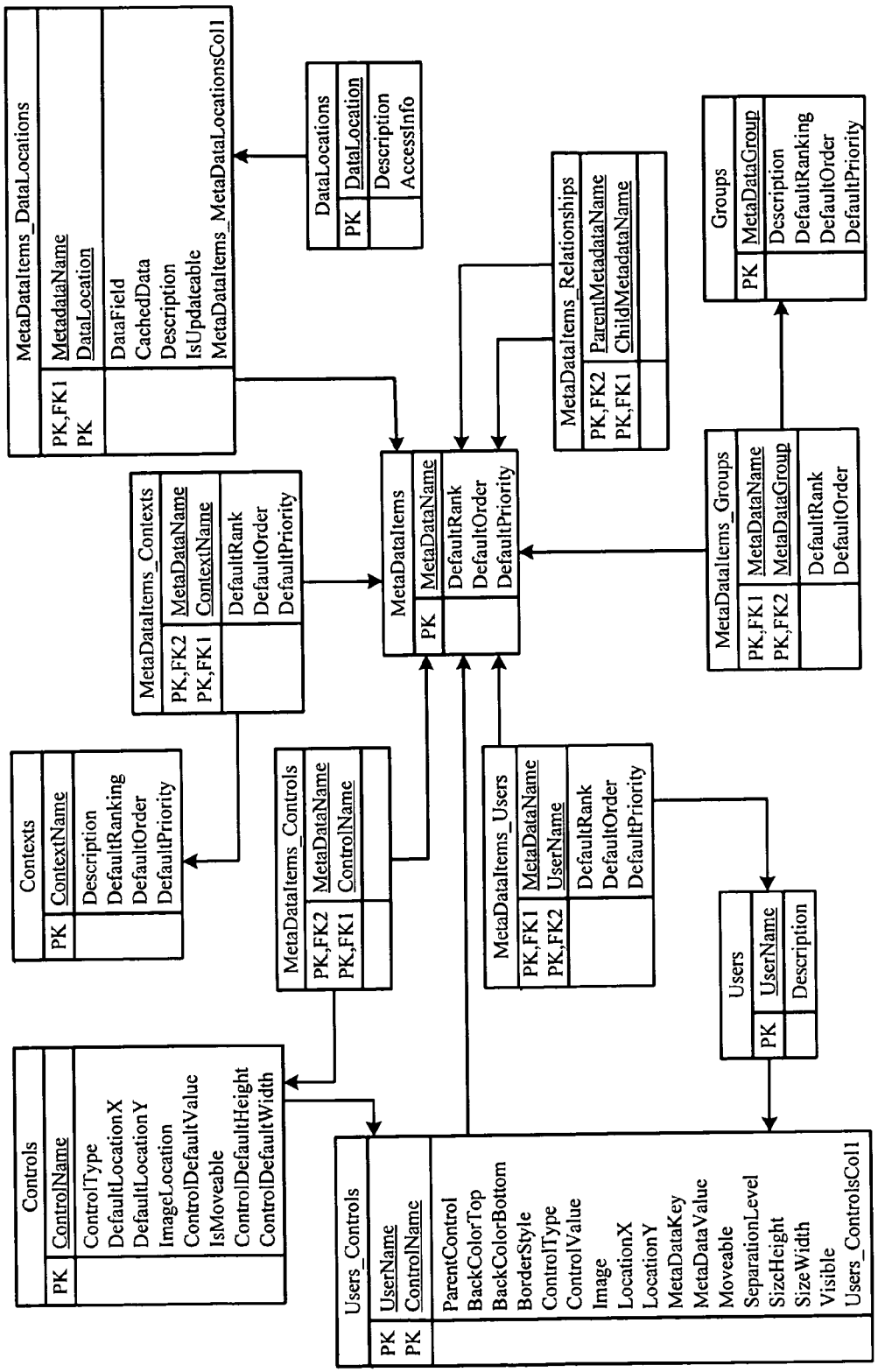
FIG. 4 illustrates an exemplary schema for a data catalog in accordance with the innovative architecture.

FIG. 4 illustrates an exemplary schema for a data catalog in accordance with the innovative architecture. Following are classes and associated definitions of what is contained in each part the schema.

MetaDataItems contains references for each data element known by the system, with its default rank, order and priority.

MetaDataItems_Relationships contains the relationships between the items. An item can have any number of relationships and be both a parent and a child of another item.

DataLocations defines the locations of the data and method of accessing the location, as well as a further definition contained in an XML (extensible markup language) document in an AccessInfo field.

MetaDataItems_DataLocations contains the references where this data element can be sourced. It also contains a location where data can be cached, if found. The applications can then choose to use the cached data, or not, if the source is unavailable.

Groups and MetaDataItems_Groups allow the grouping of items for easier access and definition by the application and/or user. This allows for type definition of data without knowing the individual data elements (e.g., documents or purchase orders).

Contexts and MetaDataItem_Contexts allow the accessing of data based upon one or more contexts as defined by the user and/or application, and include default rank, order and priority information. The contexts can include Monday Morning Tasks, Year End Processing, and Patents to Publish, just to name a few examples.

Users and MetaDataItems_Users allow definition of specific data for users and/or applications, and is a method for defining specific data elements as private. Default rank, order and priority information can also be included.

Controls, User_Controls, and MetaDataItems_Controls allow definition of characteristics for the visualization of data based upon user/application presence or item. The Controls class can include control type, defaults locations for the x and y positions, image location, a default control value, whether the control is moveable and, the con troll height and width. The User_Controls class can include parent control data, back color data for top and bottom, border style, control type and value, image, x and y location, metadata key and value information, moveability data, level separation data, size height and width data, whether it will be visible or not, and users control column information.

Using a data layer component on top of the actual schema provides the ability to process the data and rules effectively. The main logic for the data layer component can be exemplified as follows:

```
create proc GetRelatedDataForEntity
    @DataName1 varchar(255)= 'VendorName',
    @DataValue varchar(255) = 'Fabrikam',
    @MaxRank tinyint = 4,
    @Context varchar(255) = 'Chris, Fabrikam'
as
set nocount on
create table #t (
                f2 varchar(255),
                DataField varchar(255),
                DefaultRank tinyint,
                DefaultOrder tinyint
                )
declare @SubDataLocation varchar(512)
declare @DataField varchar(255)
declare @KeyField varchar(255)
declare @ToDataName varchar(255)
declare @DefaultRank tinyint
declare @DefaultOrder tinyint
declare @sql varchar(4000)
declare @key varchar(255)
--now get all the data for the metadata name
declare xx cursor local fast_forward for
    select distinct SubDataLocation, DataField, KeyField,
ChildDataName, coalesce(md.DefaultRank, mdg.DefaultRank),
coalesce(md.DefaultOrder, mdg.DefaultOrder)
        from DataDefinitions_Relationships md_r
            inner join DataDefinitions_DataLocations md_l on
                md_r.ChildDataName = md_l.DataName
            inner join DataDefinitions_Contexts mdg on
                md_r.ChildDataName = mdg.DataName and
                mdg.ContextName not in (select ContextName from
DataDefinitions_Contexts where DataName = @DataName1)
            inner join DataDefinitions md on
```

-continued

```
                md_r.ChildDataName = md.DataName
        where
                md_r.ParentDataName = @DataName1
open xx
fetch next from xx into @SubDataLocation, @DataField, @KeyField,
@ToDataName, @DefaultRank, @DefaultOrder
while @@fetch_status = 0
  begin
        set @sql = 'insert into #t select distinct ''' + @ToDataName
+ ''', ltrim(' + @DataField + '), ' + cast(@DefaultRank as
varchar(255)) + ', ' + cast(@DefaultOrder as varchar(255)) + ' from '
+ @SubDataLocation
        set @sql = @sql + ' rtrim(ltrim(q.' + @KeyField + ')) = '''
+ replace(@DataValue,'"','"""') + ''') q';
        -- print @sql
        if (@sql is not null)
            Begin
                exec (@sql)
            end
  fetch next from xx into @SubDataLocation, @DataField, @KeyField,
@ToDataName, @DefaultRank, @DefaultOrder
  end
select    distinct
        mdc.ControlName + '_' + t.f2 + '_' +
replace(replace(replace(replace(replace(coalesce(t.DataField,
        mdc.ControlDefaultValue),' ','_'),'.','_'),'-','_'),
        '@','_'),',','_')
ControlName,
        mdc.ControlType,
        coalesce(t.DataField, mdc.ControlDefaultValue)
ControlValue,
        mdc.DefaultLocationX,
        mdc.DefaultLocationY,
        mdc.ControlDefaultHeight,
        mdc.ControlDefaultWidth,
        g.ContextName,
        g.DefaultDisplayPosition,
        coalesce(mdg.DefaultRank, t.DefaultRank) DefaultRank,
        coalesce(mdg.DefaultOrder, t.DefaultOrder) DefaultOrder,
        cast(0 as bit) PrimaryEntity,
        mdg.DataName,
        '' Parent,
        99 ControlDepth
    from #t t
        left join DataDefinitions_Controls on
            t.f2 = DataDefinitions_Controls.DataName
        left join DisplayDefinitions mdc on
            DataDefinitions_Controls.ControlName =
mdc.ControlName
        left join DataDefinitions_Contexts mdg on
            mdg.DataName = t.f2
        left join Contexts g on
            mdg.ContextName = g.ContextName
    where t.DefaultRank <= @MaxRank and
            coalesce(t.DataField, mdc.ControlDefaultValue) != ''
union
    select    distinct
        u.ControlName,
        u.ControlType,
        u.ControlValue,
        u.LocationX DefaultLocationX,
        u.LocationY DefaultLocationY,
        u.SizeHeight ControlDefaultHeight,
        u.SizeWidth ControlDefaultWidth,
        g.ContextName,
        g.DefaultDisplayPosition,
        Rank DefaultRank,
        Ordering DefaultOrder,
        PrimaryEntity,
        DataName,
        ParentControl Parent,
        ControlDepth
    from DisplayDefinitions_DefaultControls u
        left join Contexts g on
            u.ContextName = g.ContextName
        where    MetaDataValue = @Context and
                Rank <= @MaxRank
    order by    ControlDepth,
            PrimaryEntity desc,
```

```
            g.DefaultDisplayPosition,
            DefaultRank,
            DefaultOrder
drop table #t
```

As a sidebar to business implementation, in one business-related customization example for building a data catalog, a methodology for gathering and cataloging data can include of the following steps (or processes): collect detailed data from on-site research of a worker's experience; analyze the research in order to build a deep understanding of the information worker's experience; create an experience model that describes the information that a worker might experience; create a map of the tasks and the flow of data for each task, indicating data input and output; and, build a database that catalogs the data according to the data flow mapping. This indicates that in one example, a manual method facilitates setting values as a dynamic method that increases the types of values and links through usage.

The experience model ultimately identifies and links the components of the worker's world in terms of data: the entities that handle the data (the individuals, departments, companies, and software applications with whom the worker interacts); the containers of data documents and focus from database or file; and, the key data elements (the input and output for each task that describes the flow of data elements from sources to destinations (internal and external)). Identifying the source and destination of each task in terms of these components produces an outline of the data flow.

The experience model is the basis for creating a data map. This step involves first identifying the key activities and breaking each activity into its requisite tasks or steps, then identifying the documents and individual data elements for each task. The data map defines both the process and the data points to elevate for each process. It identifies the sources of data required for task completion (input), the destination of data and its format (output), and the key data elements for task completion in terms of each core and related document. The data map illustrates flow patterns at a very granular level of the data elements, and demonstrates the flow of the data from one context to another over time. The map identifies patterns in data element handling and flow and produces a framework for populating the data catalog. The data map also helps identify gaps in the collected information, which become goals for further research.

The data map provides the basis for the data catalog, which populates key data for each process (task or step). As previously indicated, the catalog contains the individual data elements and identifies the various contexts in which the data elements are used such as role, user, process, document, point in time, and device, for example.

As indicated supra, the disclosed architecture also provides a model-driven UI. In support thereof, a display layer is provided that is not fixed and interacts with the user based upon user preferences and rules, and is driven by the classes and data enabled by the information model. Moreover, the positioning and grouping of controls, control characteristics, and control behavior are driven directly by the information model and not by the display surface or device. Further, the information model is made aware of the size and characteristics of the display thereby enabling different data to be displayed based device display parameters.

Figure 5:
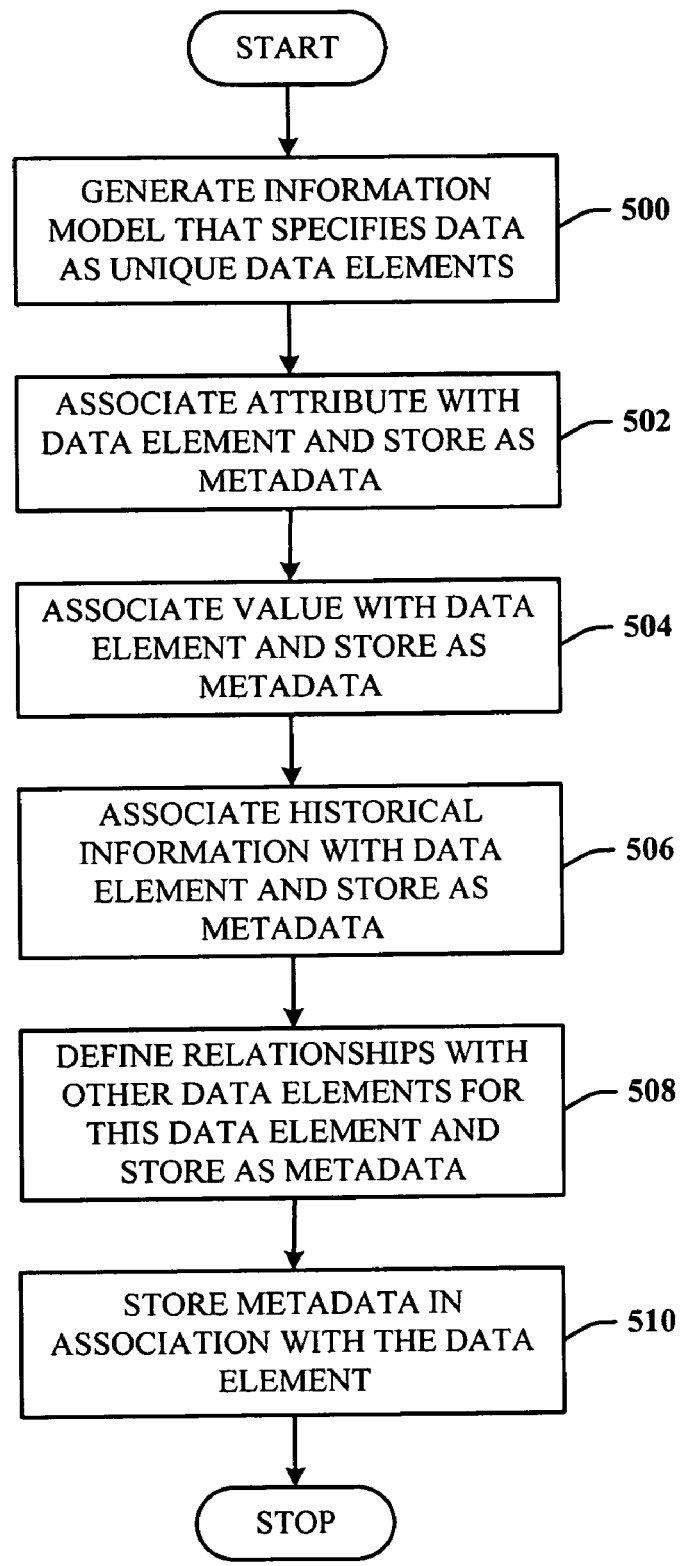
FIG. 5 illustrates a methodology presenting data based in device display information stored in the information model.

FIG. 5 illustrates a methodology presenting data based in device display information stored in the information model. The awareness of the information model to the size and characteristics of a device display enables data to be displayed differently based upon the pixel density of the display, for example. At 500, an information model is provided having at least display data represented therein. At 502, the current device type is determined. At 504, the device type data is compared with the relevance information and with hierarchy information. At 506, the results are then correlated with data from the preferred source. At 508, the systems checks if the device display can handle a graphic representation of the data. At 510, if so, display data graphically. If the device cannot handle graphical representations of the data, at 512, a textual representation is sent to the device for viewing on its display.

The definition of displayed data can be further refined by user preferences that specify the characteristics of the control where the data is displayed through properties defined in User_Controls, as described in FIG. 4.

A user's preferences can be learned and stored based upon changes made in the display as the application is being used. Additionally, there are display components that are only for purposes of data display.

Figure 6:
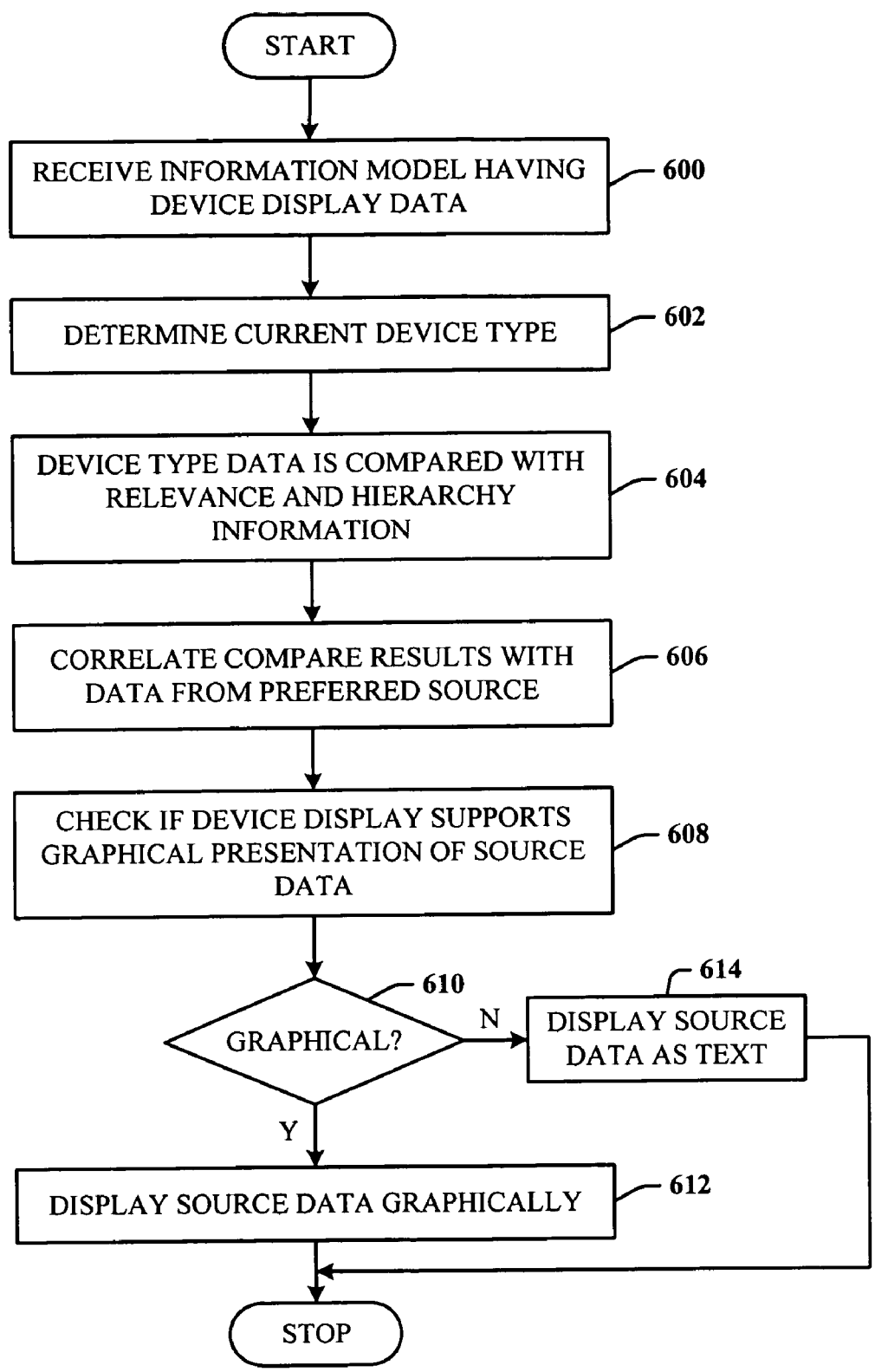
FIG. 6 illustrates a methodology of defining data to be displayed based on user preferences.

FIG. 6 illustrates a methodology of defining data to be displayed based on user preferences. At 600, an information model is received that includes device display data. At 602, the current device type is determined. At 604, device type data is compared with relevance and hierarchy information. At 606, the comparison results are correlated with data from a preferred source. At 608, a check is made to determine if the display supports graphical representation of the source data. At 610, graphics is supported, flow is to 612 where the source data is displayed graphically. On the other hand, if the display supports only text, flow is to 612 to display the source data as text for viewing.

Figure 7:
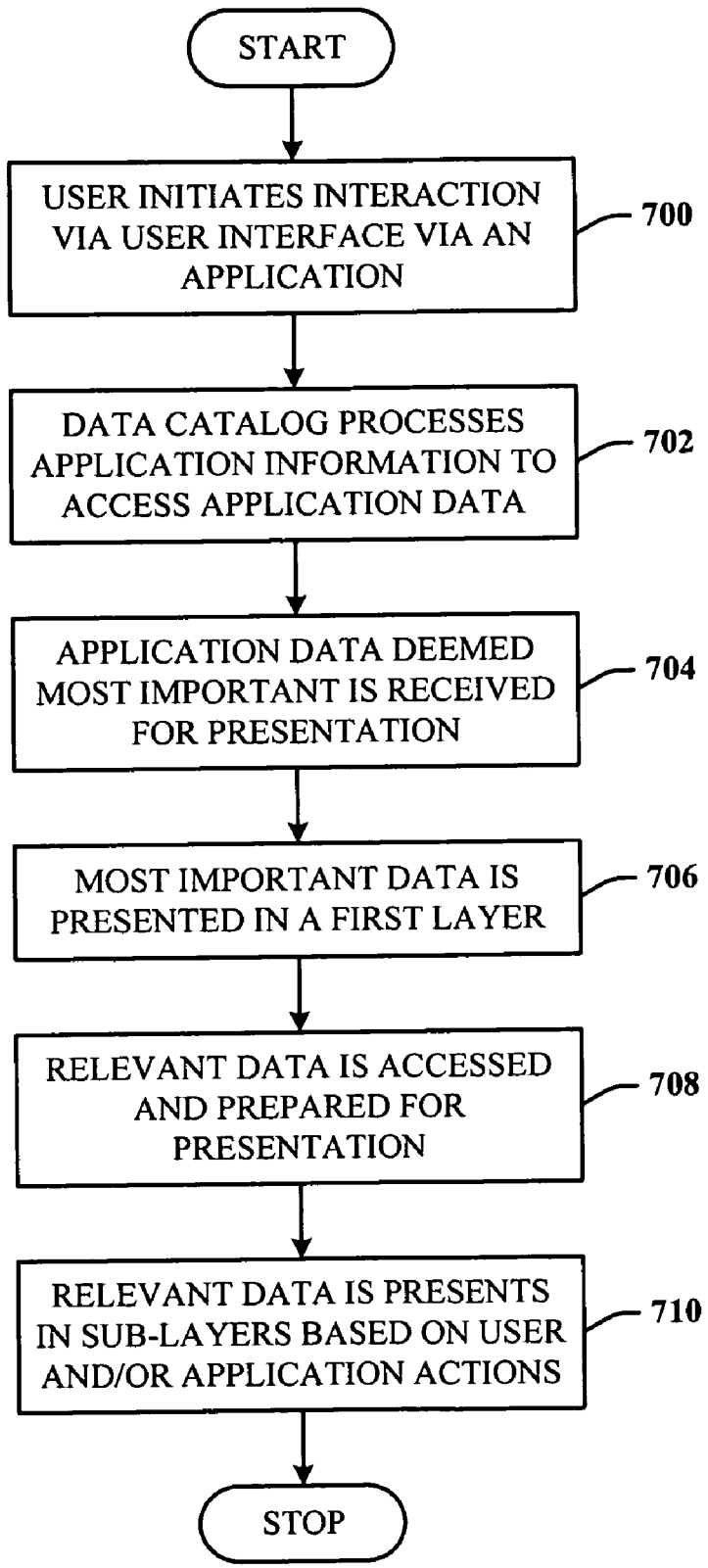
FIG. 7 illustrates a methodology of presenting data based on importance.

Hierarchical levels determine the layer in which data content displays. The smallest amount of information necessary is displayed in the first level in the hierarchy based on deemed importance. FIG. 7 illustrates a methodology of presenting data based on importance. At 700, the user initiates interaction with the user interface via an application. The user interaction defines a focus of the user, as monitored by the system. At 702, the data catalog receives associated application information and facilitates access of data associated with the application. At 704, the system retrieves data deemed the most important and most relevant based on the user focus. The data can be retrieved from a cache and/or from a source on which the data is persisted. At 706, the system presents the data in layers with the most important data displayed in a first layer. At 708, the system retrieves additional data, that is, data deemed relevant to the important data, and prepares it for presentation as sub-layers to the first layer. At 710, the sub-layers of additional relevant data are exposed based on user and/or application actions.

Figure 8:
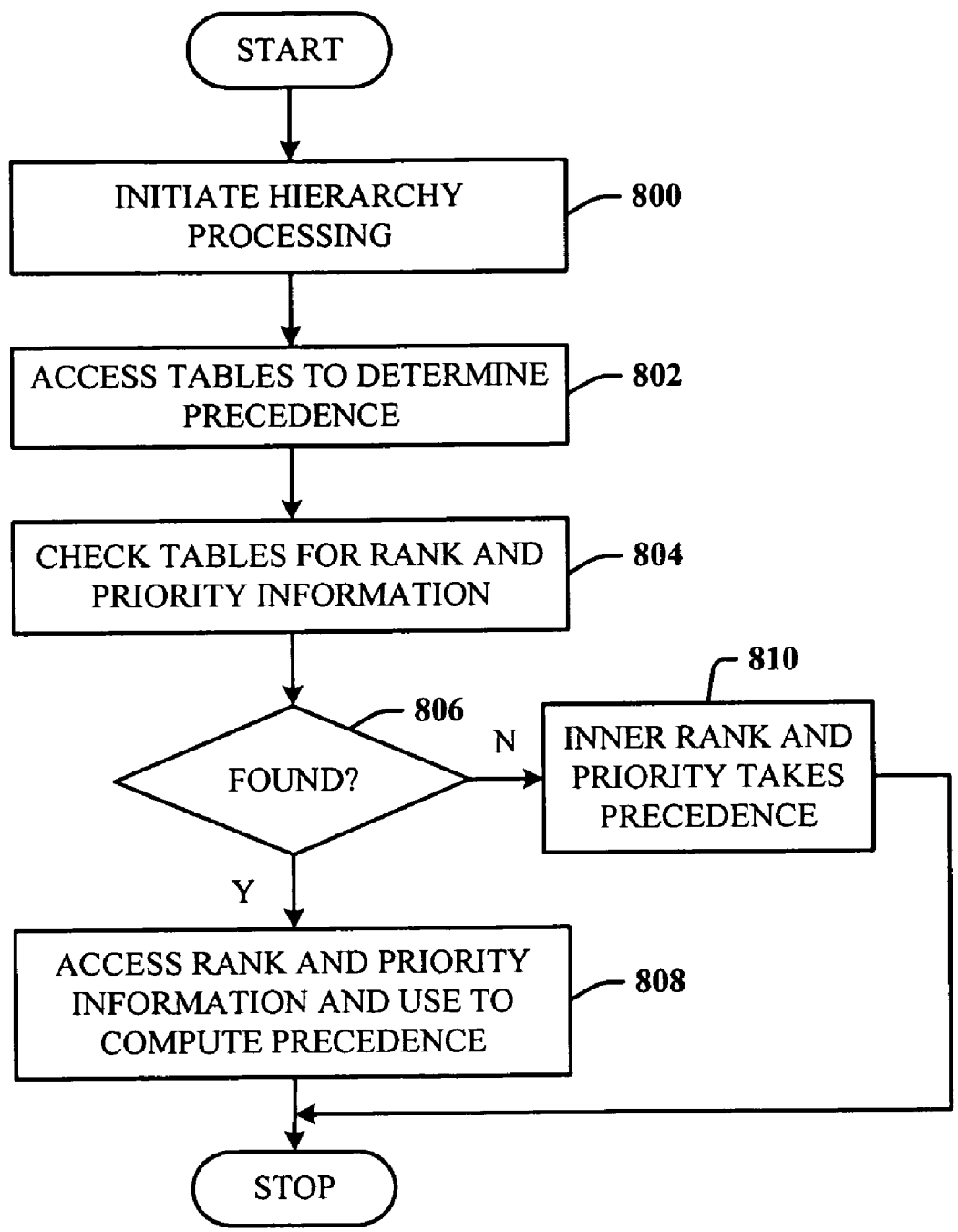
FIG. 8 illustrates a methodology of changing hierarchy.

The user has the ability to change this ranking (or location in the hierarchy) of the data elements and to display more levels, as desired. FIG. 8 illustrates a methodology of changing hierarchy. Hierarchy is computed based on rank and priority. At 800, hierarchy processing is initiated. At 802, each table is accessed as part of determining precedence. At 804, the tables are checked for rank and priority information. At 806, if the information is found, flow is to 808, where the rank and priority information is accessed and used to compute precedence. If no rank and/or priority information is found at the parameter-related data, then flow is from 806 to 810 where the inner rank and priority takes precedent. Rank and priority are defaulted at the item level and can be overridden during retrieval.

The flow of information display adheres to a set of layout rules, including grouping and free form. A part of data presentation is to deliver forms that understand principles of layout, and that can organize and present data to the user in a manner that reflects hierarchy, relevance, and function. Up to now, the burden of making these decisions has been placed on the forms designer. This designer model works well for designing forms that do not change or change infrequently.

However, in an environment where data is in constant flux based on changes in company policies and in the current business situation such as a partial confirmation exception, for example, it is a formidable task for designers to continue to redesign a form to meet data requirements as the requirements change in realtime. Likewise, it is equally difficult to expect that each form be designed for all possible changes to data as well as changes to what is relevant to the user. Instead, the disclosed architecture provides the logic for presenting data into a form (called a dynamic form) that adheres to a set of layout rules, a hierarchical relationship of elements, and is sensitive to the screen constraints of where the data is displayed.

Forms adhere to a set of layout rules for flowing data that adheres to standard design concepts, while also maximizing the viewing experience and efficiency for the user. Examples of standard design concepts include mapping to a 2-column grid or auto correction for orphaned or widowed elements in a column of text or data. In addition, sensitivity to screen constraints is provided. A grouping of images that illustrate the design of a widget can be displayed to the user.

With respect to form adaptation to resizing, a parent container itself contains maximum and minimum columns, and minimum and maximum height of the form. When the form is physically narrowed, a table section drops below certain information, keeping all information visible, and preventing horizontal scrolling. Controls can also be set to grow with the use of the form. As the width increases, the text boxes increase in width as well.

The adaptable image container can be configured to display multiple images from a single source or multiple sources. The container can also be configured to display these images all at once or adapt to the size of the container on the form. As appropriate, the user is given a paging mechanism for viewing images. As the container is resized, images are hid or revealed. The container is also smart to respond to horizontal and vertical resizing.

Figure 9:
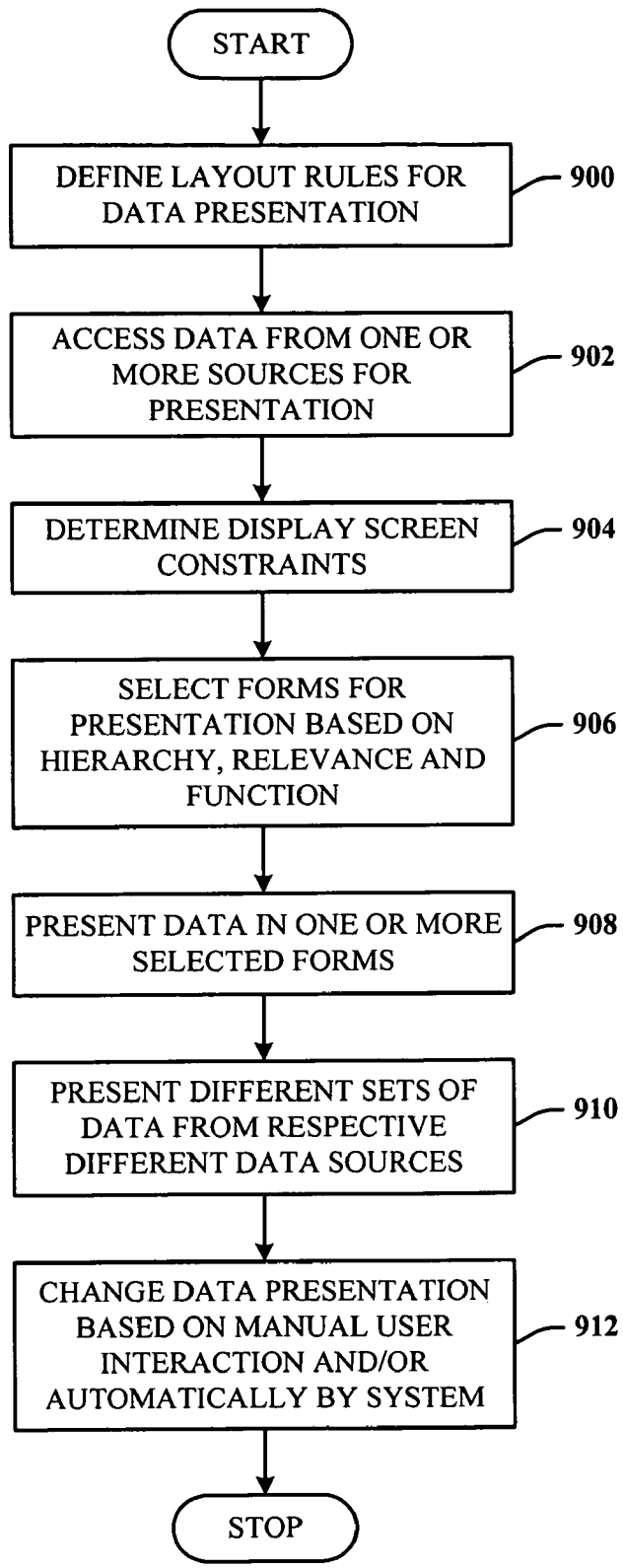
FIG. 9 illustrates a methodology of presenting data according to flexible forms.

FIG. 9 illustrates a methodology of presenting data according to flexible forms. At 900, layout rules for data presentation are defined. These rules apply to groupings as well as free form scenarios. At 902, data is accessed from one or more data sources, for presentation. At 904, constraints associated with presenting the data (e.g., screen resolution, display size, display dimensions, . . . ) are determined. At 906, one or more forms are selected for presenting data based one or more of hierarchy, relevance, and function. At 908, data is presented in the one or more selected forms. At 910, different sets of data from respective different data sources are presented. At 912, data presentation is changes based on manual user interaction and/or automatically by the system (e.g., display component).

Data is elevated for core documents and related documents (in other words, for relevant data and related data). Core documents can include documents from an integrated application, a file from a file system, or even a URL link to web content. Related documents and their respective relevant data are listed based on data elements mapped between the related document and core document. The mapping may occur at design time by a modeler, or the worker can define it a runtime. The user can map fields, indicating the relationship, while viewing data across multiple documents. Selection of an icon causes key data elements of a document to surface in the UI. While viewing data that has been elevated, the user still has the ability to right-click and open the document in its native application.

To support the ability to organize data on a form, the system supports a set of attributes that can attach to data to instruct the form on the container association, data element position with in the container, as well as data element dependencies.

Relevance is the level of importance that is attributed to the data elements. Depending on the current context, users may want to see high relevance data, a combination of high and medium relevance data, or any combination that makes sense to the user at the time. The relevance level can be defined and modified by any of the users of the system, and is pushed down through the rank of modeler, manager and worker, with the end user having the ability to personalize the data they most care about. Containment defines where in the hierarchical structure of the form the data will be displayed. Containment can be determined by a static property or can be driven by factors of the current context. Positioning determines the order of data placement within a container by a forms rendering engine. For example, in a billing information container, a company name would have a position of 1, the contact name would have a position of 2, and so on. Positioning does not indicate placement on the form, only the order that it appears. A layout component of the form rendering engine can be used to determine where to put it.

Hierarchical levels determine the layer in which data content displays. The most important and smallest amount of information necessary is the first level of importance in the hierarchy. The user has the ability to change this ranking (location in the hierarchy) of any data elements and to display more levels as needed. Rich context ranking enables the user to view layers of data from the core and related documents as needed, according to their level of importance to the task. The most important and least amount of information necessary can be presented via the first layer that surfaces. The user can choose to expose more layers as needed.

Figure 10:
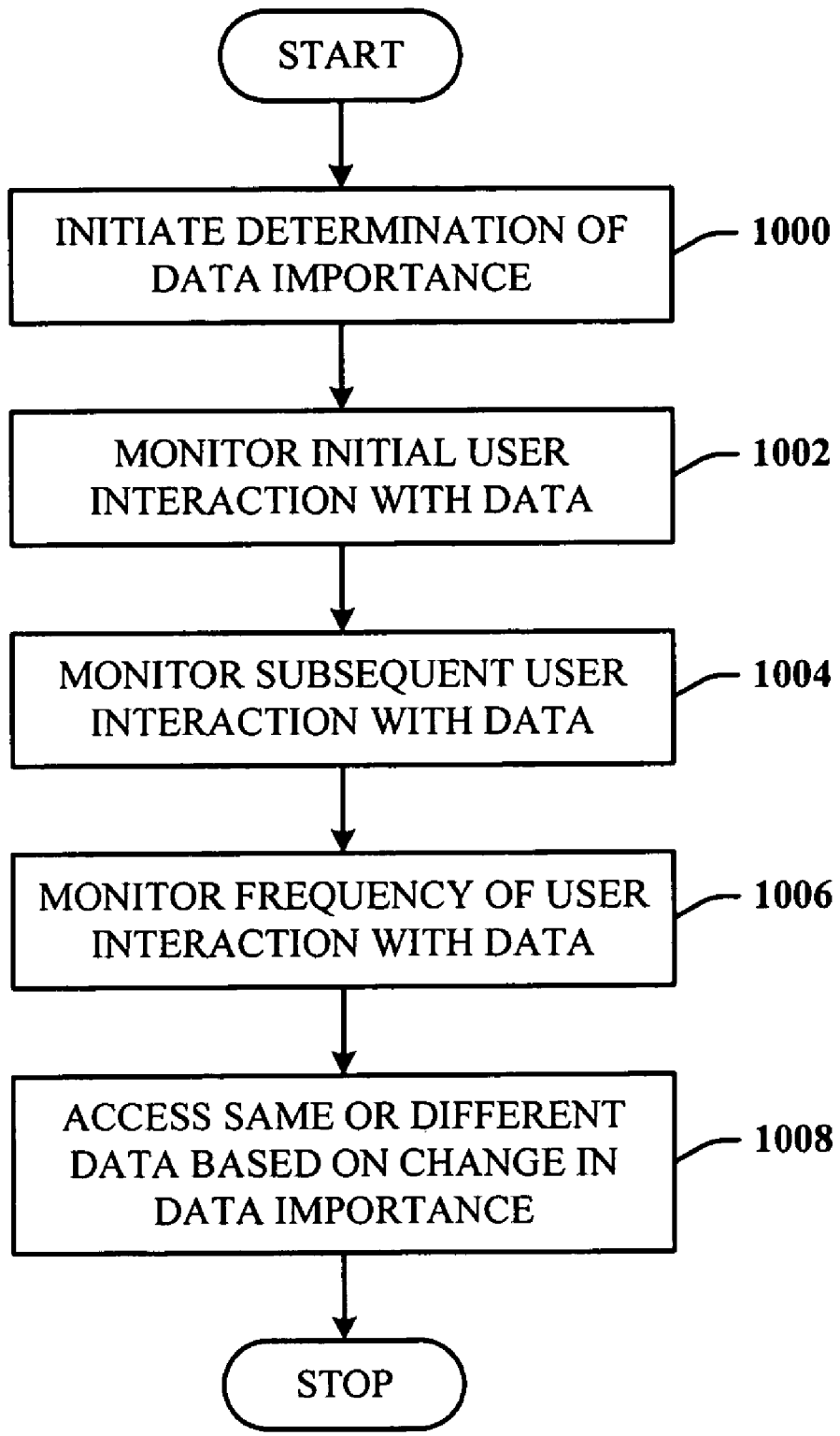
FIG. 10 illustrates a methodology of changing data importance.

In place of configuration ranking at design time, a modeler could opt to have the system determine data rankings dynamically based at runtime on user choices. FIG. 10 illustrates a methodology of changing data importance. At 1000, the determination of data importance is initiated. At 1002, the system monitors initial user interaction with data by recording the user's selection of data elements upon first use of a document type. At 1004, subsequent user interaction can also be monitored. With each subsequent access by the user, analysis of the user's historical choices of data elements enables a more accurate display of preferred data elements. At 1006, the user's frequency of selection can also be employed to determine the level of importance for each data element. At 1008, the same or different data can be accessed based on change in the data importance. In other words, if the user and/or system actions indicate that previously ranked data is now deemed less important, the system records and assigns lesser importance to the data.

Data from messages and notes that correlate to the process and the evidence (core and related documents) can be elevated, and the messages and notes of communication threads can be displayed. Because communication threads contain content that can be vital to the completion of a task, they can be an important part of data elevation. Data elevation gives the worker all the information they need when they need it to complete a task. Accordingly, correlated communications can play an important part of task completion.

Data can be organized based on the hierarchical relationship between the data elements derived from one or multiple sources, and from data that is specified in the data catalog. A goal of defining this hierarchy is to provide a set of constraints that will allow for the accurate and appropriate display of elements in the proper context. The hierarchy includes a form level, container level, and element level. The form level is the highest-level container and can contain a simple set of data elements, or subcontainers, that group data by an existing relationship. For example, a hover summary can provide some key data elements concerning a selected object. A more complex example is a step detail or a purchase order.

Container levels are a group of data elements within a form. A container can additionally be broken down into types, such as a table for the line items versus multiple columns for shipping information. A parent container defines rules and properties for child containers. Containers can be nested and adhere to parent container boundaries. Containers support n number of nesting at container levels. An element level is an individual data element that is associated with a container. Element properties can override properties inherited from the parent.

The ability for the form to determine placement of elements is extended to containers as well. For example, as the form is a scaled horizontally, two 1-column containers, stacked vertically, can be repositioned to side-by-side placement.

The disclosed architecture also provides the capability to automatically sense source data availability allowing applications to poke through the display surface into an application display, if available, or using cached data, if the display is not available, without leaving the current display surface and losing context. Additionally, the representation of metadata-defined data from the business applications linked with data of the information model allowing data to be surfaced and appear related even if the application is unavailable. Data source awareness and having the abilityility to deal with data that is not sourced locally provides a unique advantage to the display surface.

Data is linked to the source location as often as possible. Source locations that are prioritized by rank and order allow data to be located and displayed from multiple locations. This is accomplished through the following two schemas and their relationships to the items:

DataLocations define the locations where data can be located and the method of accessing the location as well as a further definition contained in an XML document in the AccessInfo field.

MetaDataItems_DataLocations contains the references where this data element can be sourced. It also contains a location where data can be cached if found. The applications can then choose to use the cached data or not if the source is not available.

For multi-sourced data, the desired source location uses the following algorithm:

$$DisplayData = DisplaySource(Max(Source.Priority)).Value$$

Default templates for documents (e.g., transactional) can be provided from integrated applications (e.g., LOB). Each template is preformatted and contains standard data elements of the business document. The user can adjust the template as needed, adding, removing, and rearranging the data elements on the form to meet the needs of the business.

For file system documents, file properties are the lowest level of data elevated. In addition to file properties known to the system, the user can define data elements for structured or semi-structured documents. To do this, the user opens the document and manually highlights fields or ranges of text, assigning data elevation values to them, and then arranging those data elements.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
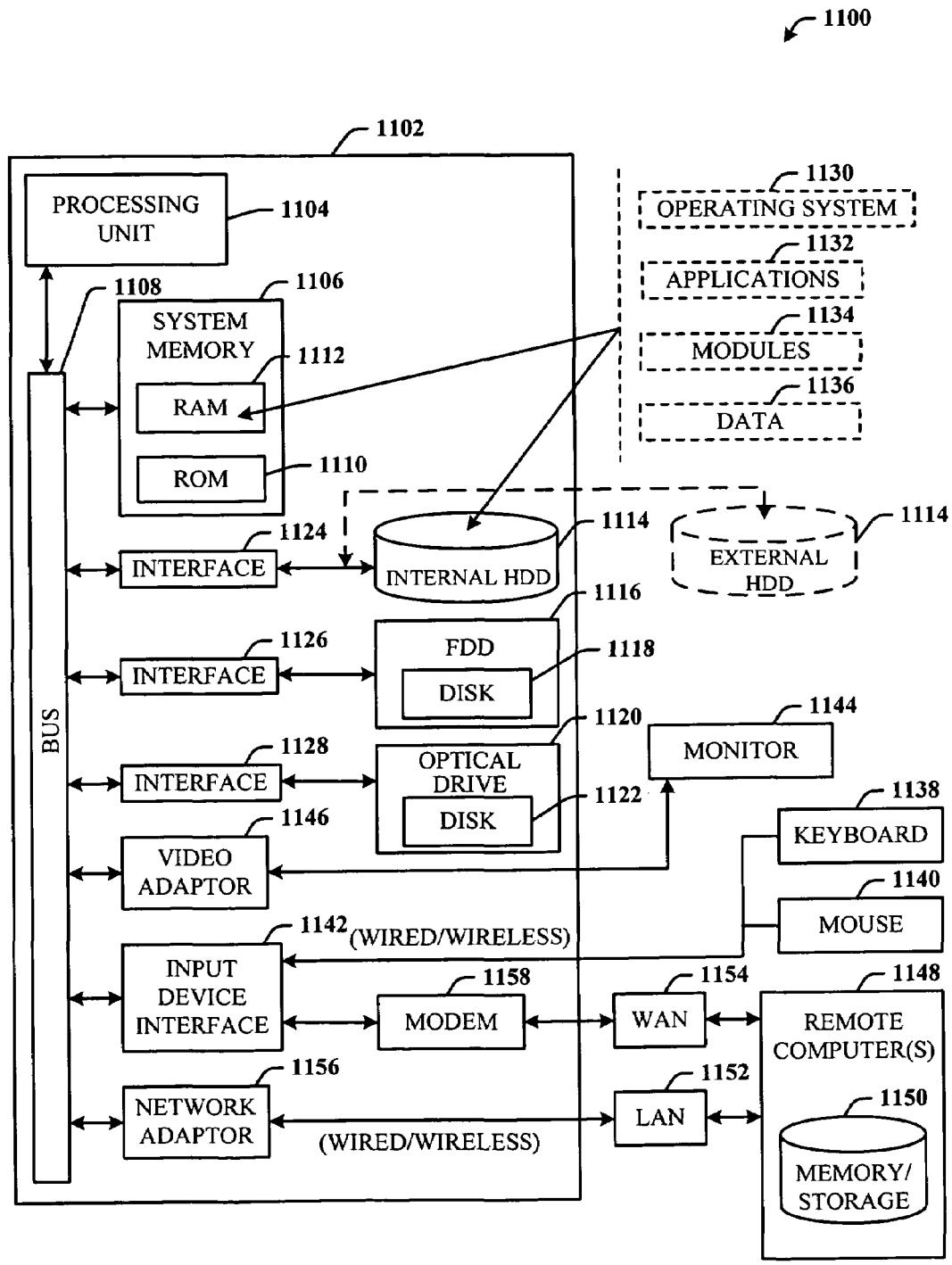
FIG. 11 illustrates a block diagram of a computer operable to execute flexible data presentation in accordance with the disclosed architecture.

Referring now to FIG. 11, there is illustrated a block diagram of a computer operable to execute flexible data presentation in accordance with the disclosed architecture. In order to provide additional context for various aspects thereof, FIG. 11 and the following discussion are intended to provide a brief, general description of a suitable computing environment 1100 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1102 through one or more wired/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 12:
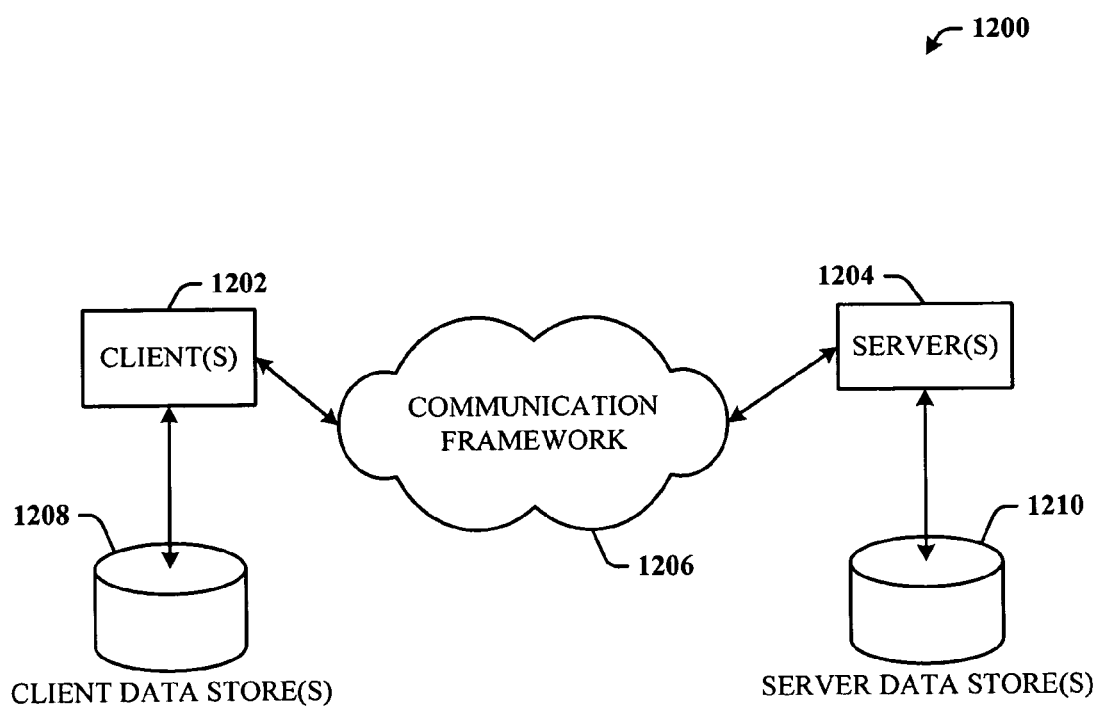
FIG. 12 illustrates a schematic block diagram of an exemplary computing environment that facilitates flexible data presentation using metadata.

Referring now to FIG. 12, there is illustrated a schematic block diagram of an exemplary computing environment 1200 that facilitates flexible data presentation using metadata. It is within contemplation of the subject architecture that data can be sourced not only from local data sources, but also from distributed or remote systems or data sources such as associated with client/server systems, for example. Peer-to-peer connections can also be supported.

The system 1200 includes one or more client(s) 1202. The client(s) 1202 can be hardware and/or software (e.g., threads, processes, computing devices). The client(s) 1202 can house cookie(s) and/or associated contextual information by employing the subject innovation, for example.

The system 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications: and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates data management, the computer-implemented system having a processing unit executing computer-executable components stored in memory comprising:
    an information model for specifying information from one or more documents, wherein a document accessed by a user on a computer is broken down into data elements as the user makes changes to the document, each data element representing a subset of data included in the document, the data elements stored in a database on the computer as a data catalog of unique data elements and data element relationships in metadata, the metadata associated with each unique data element in the data catalog defining one or more data sources for accessing the data element, a context for the data element based on user interaction with the document, and priority information for prioritizing the one or more data sources and prioritizing the data element for viewing, wherein the metadata in the data catalog is updated when other documents that reference a same unique data element identified in the data catalog are changed using one or more applications; and
    a display component driven by the information model for automatically displaying relevant data elements across multiple documents that are identified in the data catalog, the relevant data elements accessed from the one or more data sources and surfaced to a display layer for viewing based on the priority information defined by the metadata associated with the relevant data elements and a current user activity determined to be relevant to the context defined by the metadata associated with the relevant data elements, wherein the relevant data elements across multiple documents are surfaced and viewed even if one or more of the applications are unavailable.

2. The system of claim 1, wherein the data catalog is created as an application is used by the user to change the document and is updated according to further changes to the document by a second user.

3. The system of claim 1, wherein the information model facilitates relating structured and unstructured documents.

4. The system of claim 1, wherein the information model facilitates relating one data source to another data source at least one of explicitly by an act of a user and implicitly through tracking of user activity.

5. The system of claim 1, wherein the display component facilitates presentation of controls, positioning and grouping of the controls, and control characteristics and behavior, driven directly by the information model.

6. The system of claim 1, wherein the display component selects between graphical presentation and text presentation of data based on device capabilities.

7. The system of claim 1, wherein the display component presents data according to hierarchical levels, the levels determining a layer in which data content is displayed.

8. The system of claim 1, wherein the information model includes references to multiple data sources where a data element is sourced.

9. The system of claim 1, wherein the information model includes a reference to where a data element associated with an application can be cached.

10. The system of claim 9, wherein the application selects cached data depending on availability of a data source.

11. The system of claim 1, further comprising a data layer component for automatically sensing source data for a current context, the display component automatically surfacing the source data without interrupting the current context.

12. A computer-implemented method of managing data, comprising:
    specifying a document accessed by a user on a computer;
    breaking down the document into a set of data elements as the user makes changes to the document, each data element representing a subset of data included in the document;
    storing each data element as a unique entity that has a relationship to another unique entity in a database on the computer as a data catalog organized as a set of related data elements;
    storing attributes and relationships of the related data elements in metadata in the data catalog, the metadata data for each unique entity defining one or more source locations for accessing the entity, a context for the entity based on user interaction with the document, and priority information for prioritizing the one or more source locations and prioritizing the entity for viewing;
    updating the metadata in the data catalog when other documents that reference a same unique data entity identified in the data catalog are changed using one or more applications; and
    driving a flexible display layer directly from the data catalog for automatically displaying relevant unique entities across multiple documents that are identified in the data catalog, the relevant unique entities accessed from the one or more source locations and surfaced to a display layer for viewing based on the priority information defined by the metadata for the relevant entities and a current user activity determined to be relevant to the context defined by the metadata associated with the relevant entities, wherein the relevant unique entities across multiple documents are surfaced and viewed even if one or more of the applications are unavailable.

13. The method of claim 12, further comprising interrelating structured and unstructured information based on the metadata and the relationship.

14. The method of claim 12, further comprising storing user preferences based upon changes made by a user as an application is being used.

15. The method of claim 12, further comprising displaying data from multiple source locations based on a prioritization of the source locations by rank and order.

16. The method of claim 12, further comprising varying a quantity of data to be displayed based on data importance.

17. The method of claim 12, further comprising surfacing and presenting the relevant unique entities when a corresponding application that was used by the user to change the document is unavailable.

18. The method of claim 12, further comprising displaying data differently based on size and characteristics of a display.

19. The method of claim 12, further comprising automatically presenting data from multiple data sources in accordance with a form that is dynamically accessed and populated with the data for presentation.

20. A computer for data management, comprising:

computer-implemented means for defining a schema for storing data from one or more documents generated by an application, wherein a document accessed by a user on a computer is broken down into data elements as the user makes changes to the document using the application, each data element representing a subset of data included in the document, the data elements stored in a database on the computer as a data catalog of unique data elements;

computer-implemented means for describing a set of relationships, attributes and values of the unique data elements in metadata in the data catalog, the metadata for each unique data element defining one or more data sources for accessing the data element, a context for the data element based on user interaction with the document, and priority information for prioritizing the one or more data sources and prioritizing the data element for viewing, wherein the metadata in the data catalog is updated when other documents that reference a same unique data element identified in the data catalog are changed using one or more applications;

computer-implemented means for automatically sensing availability of the data elements from the one or more data sources defined by the metadata;

computer-implemented means for automatically surfacing relevant data elements across multiple documents that are identified in the data catalog and related data, the relevant data elements accessed from the one or more data sources and surfaced to a first display layer for viewing based on the priority information defined by the metadata associated with the relevant data elements and user interaction with the first display layer determined to be relevant to the context defined by the metadata associated with the relevant data elements, wherein the relevant data elements across multiple documents are surfaced and viewed even if one or more of the applications are unavailable, and wherein the related data is surfaced and viewed in a second display layer; and computer-implemented means for adjusting presentation of the relevant data elements and the related data by the computer based on device parameters.

* * * * *